United States Patent [19]
Howell et al.

[11] Patent Number: 5,768,093
[45] Date of Patent: Jun. 16, 1998

[54] TECHNIQUE FOR MINIMIZING THE HEIGHT OF A PORTABLE COMPUTER

[75] Inventors: Bryan Howell, Austin, Tex.; Tim Lau, Milpitas; Ken Haven, Fremont, both of Calif.

[73] Assignee: Dell U.S.A., L.P., Austin, Tex.

[21] Appl. No.: 571,242

[22] Filed: Dec. 12, 1995

[51] Int. Cl.⁶ .................. G06F 1/16; H05K 5/03
[52] U.S. Cl. .................. 361/680; 400/682
[58] Field of Search .................. 361/680, 681, 361/683; 345/168, 169; 364/708.1; 400/681, 682; 341/22; G06F 1/16

[56] References Cited

U.S. PATENT DOCUMENTS

| | | |
|---|---|---|
| 4,476,355 | 10/1984 | Mital . |
| 4,580,022 | 4/1986 | Oelsch et al. . |
| 5,212,356 | 5/1993 | English . |
| 5,278,372 | 1/1994 | Takagi et al. . |
| 5,280,147 | 1/1994 | Mochizuki et al. . |
| 5,335,137 | 8/1994 | English et al. . |
| 5,360,955 | 11/1994 | English et al. . |
| 5,397,867 | 3/1995 | Demeo . |
| 5,532,904 | 7/1996 | Sellers .................. 361/680 |
| 5,534,891 | 7/1996 | Takano .................. 345/169 |
| 5,594,618 | 1/1997 | Sellers .................. 361/680 |
| 5,635,928 | 6/1997 | Takagi et al. .................. 341/22 |

FOREIGN PATENT DOCUMENTS

| | | | |
|---|---|---|---|
| 0010307 | 1/1997 | Japan | .................. 361/680 |

*Primary Examiner*—Lynn D. Feild
*Attorney, Agent, or Firm*—Haynes and Boone, L.L.P.

[57] ABSTRACT

A technique for minimizing the height of a portable PC comprising a lid and a base when the lid is in a closed position is disclosed. In a preferred embodiment, the lid of the PC is rotatably connected to the base in such a manner that, when the lid is in a closed position, a bezel for retaining a display within the lid depresses one or more keys positioned along the periphery of a keyboard disposed on the base, thereby reducing the height of the PC in an amount equal to the distance the keys are depressed. In one embodiment, the keys depressed by the bezel are only depressed so far as to leave a slight gap between the top surfaces of the nondepressed keys and the surface of the display, thereby preventing the nondepressed keys from scratching the surface of the display. In an alternative embodiment, the display is fabricated from or coated with a scratch-resistant material. In this embodiment, the gap between the keys and the display may be eliminated such that the display is permitted to contact, and perhaps partially depress, the keys that are not in contact with the bezel, thereby further minimizing the height of the PC.

25 Claims, 2 Drawing Sheets

TECHNIQUE FOR MINIMIZING THE HEIGHT OF A PORTABLE COMPUTER

TECHNICAL FIELD

The invention relates generally to portable personal computers and, more particularly, to a technique for minimizing the external dimensions of such portable personal computers.

BACKGROUND OF THE INVENTION

Portable personal computers (PCs) were first introduced in the early 1980s and have since enjoyed great commercial success and consumer acceptance. As the portable PC market has grown, users have continued to demand portable PCs that are increasingly smaller and lighter than their predecessors. In view of the fact that the relative dimensions of the various commercially available portable PC products are routinely published in trade and consumer magazines and that such dimensions are often a critical, if not the determining, factor in a consumer's decision to purchase a particular product, it is not an exaggeration to state that every millimeter that can be shaved off the size of a portable PC counts. In particular, it has become increasingly important to minimize the height, or thickness, of a portable PC when the lid thereof is closed.

In the past, efforts to reduce the height of portable PCs have been primarily focused on reducing the thickness of the lid portion, which contains the liquid crystal or other type of display of the PC and its associated circuitry, as well as minimizing the size, especially the height, of the electrical components contained within the base of the PC, thereby minimizing the height of the base itself. Clearly, there are certain physical limitations on how thin both the lid and the base of a portable PC can be made; therefore, it is becoming necessary to identify and eliminate the other unused space within a portable PC that affects the dimensions thereof.

An example of such unused space is the gap that exists between the top surfaces of the keys of the keyboard disposed on the base of a portable PC and the display and bezel disposed in the lid of the PC when the lid is closed. In particular, most portable PCs are designed such that, when the lid is closed, a small gap remains between the upper surfaces of the keys and the bezel that retains the LCD. This gap serves both to prevent the keys from scratching, and perhaps permanently damaging, the surface of the LCD and bezel surrounding the LCD, as well as to prevent the bezel and LCD from partially or completely depressing the keys while the lid is closed, thereby serving to maximize, or at least not to diminish, the life expectancy of the keys in those rows.

In particular, with regard to the latter purpose served by the above-described gap, most conventional keyboards comprise a switch membrane having multiple switch contacts positioned beneath respective keys such that each switch contact may be actuated by depressing the respective key. Resilient domes project upward from a flexible layer of material at each key position to serve as a "return mechanism" for biasing the key to its original undepressed condition when the key is released by the user. In the past, the lives of such dome-type keyswitch assemblies were primarily dependent on the effective lives of the domes themselves and failure of the domes through loss of elasticity commonly resulted from their subjection to a large number of tripping cycles. Similarly, maintaining keys constructed in this manner in a depressed position for extended periods of time substantially diminished the lifespan thereof.

More recently, however, keyswitch technology has improved to the point where the return mechanisms thereof can withstand a substantially greater number of tripping cycles. This has been accomplished in a number of ways, for example, by improving the construction of the domes used as the return mechanism in dome-type keyswitch assemblies or by supplementing or replacing such domes with other mechanisms, such as a scissor-type mechanism for providing additional biasing force. As a result of such improvements, it is currently possible to maintain keys in a depressed position for extended periods of time without significant detrimental effect to the keyswitch assemblies thereof.

Therefore, what is needed is a technique for minimizing the height of a portable PC when the lid thereof is closed that takes advantage of the above-described advances in keyswitch assembly technology.

SUMMARY OF THE INVENTION

The foregoing problems are solved and a technical advance is achieved by method and apparatus for minimizing the height of a portable PC comprising a lid and a base when the lid is in a closed position. In a departure from the art, the lid of the PC is rotatably connected to the base in such a manner that, when the lid is in a closed position, a bezel for retaining a display within the lid depresses one or more keys positioned along the periphery of a keyboard disposed on the base, thereby enabling a reduction in the height of a particular portable PC by an amount equal to the distance such keys are depressed.

In one embodiment, the keys depressed by the bezel are only depressed so far as to leave a slight gap between the top surfaces of the keys underlying the display and the surface of the display, thereby preventing those keys from scratching the surface of the display. In an alternative embodiment, the display is fabricated from or coated with a scratch-resistant material. In this embodiment, the gap between the keys underlying the display and the display surface may be eliminated such that the display is permitted to contact, and perhaps partially depress, those keys, thereby further minimizing the height of the PC.

A technical advantage achieved with the invention is that it enables the height of any portable PC to be reduced by as much as several millimeters without requiring the PC to be substantially redesigned.

DETAILED DESCRIPTION OF THE PREFERRED EMBODIMENT

Figure 1A:
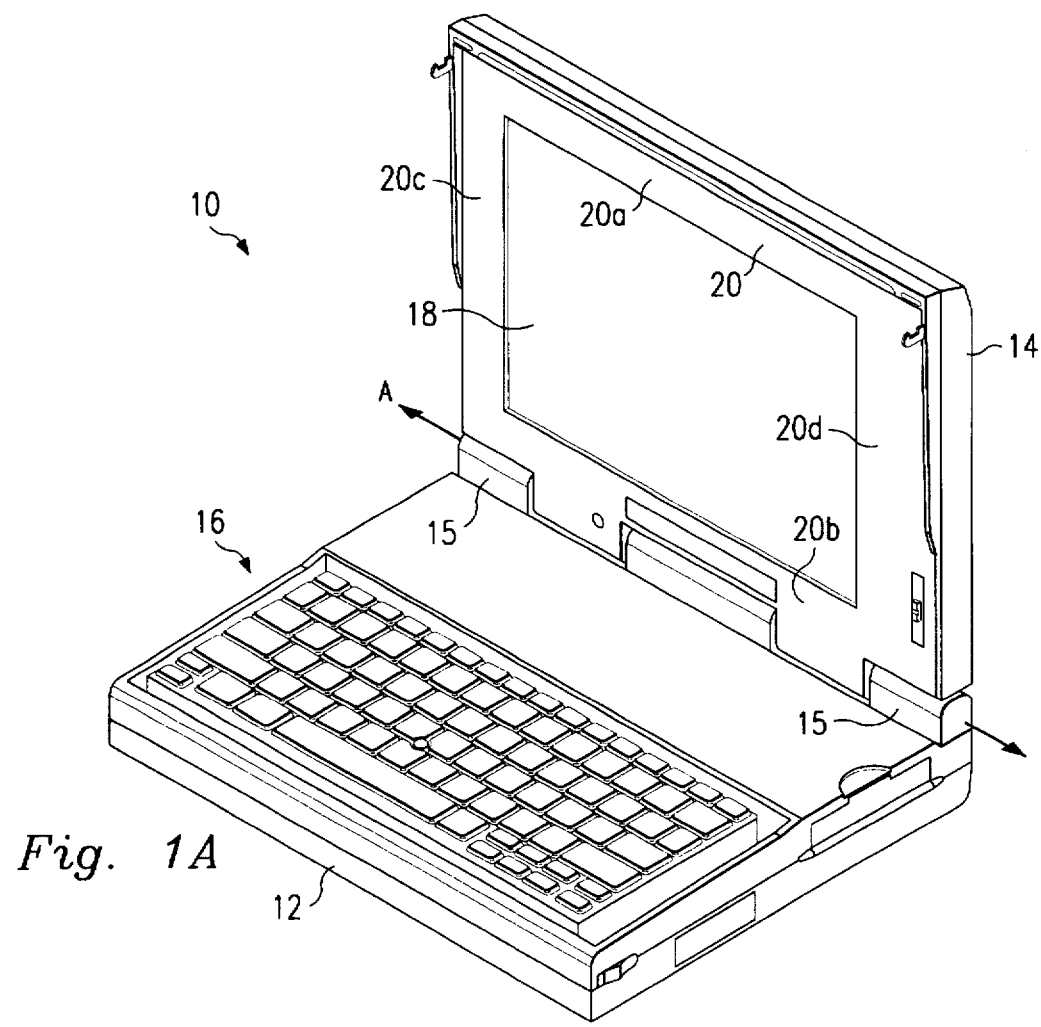
FIG. 1A is a perspective view of an exemplary portable PC embodying features of the present invention showing the PC in an open position.

FIG. 1A is a perspective view of a notebook PC 10 embodying features of the present invention showing the PC 10 in an open position. As shown in FIG. 1A, the PC 10 comprises a base 12 and a lid 14 rotatably connected to the base 12 via one or more hinges 15 or other known means for enabling the lid 14 to be opened and closed in a conventional manner by rotating the lid 14 about an axis A with respect to the base 12.

A keyboard 16 for use in inputting information to the PC 10 is disposed on the base 12. Similarly, a display, such as a liquid crystal display ("LCD") 18, is retained within the lid 14 in a conventional manner by a frame or bezel 20, that surrounds the periphery of the LCD 18. For purposes of further illustration and clarity, the bezel 20 will be described as comprising a top bezel member 20a, a bottom bezel member 20b, a left bezel member 20c and a right bezel member 20d.

Figure 1B:
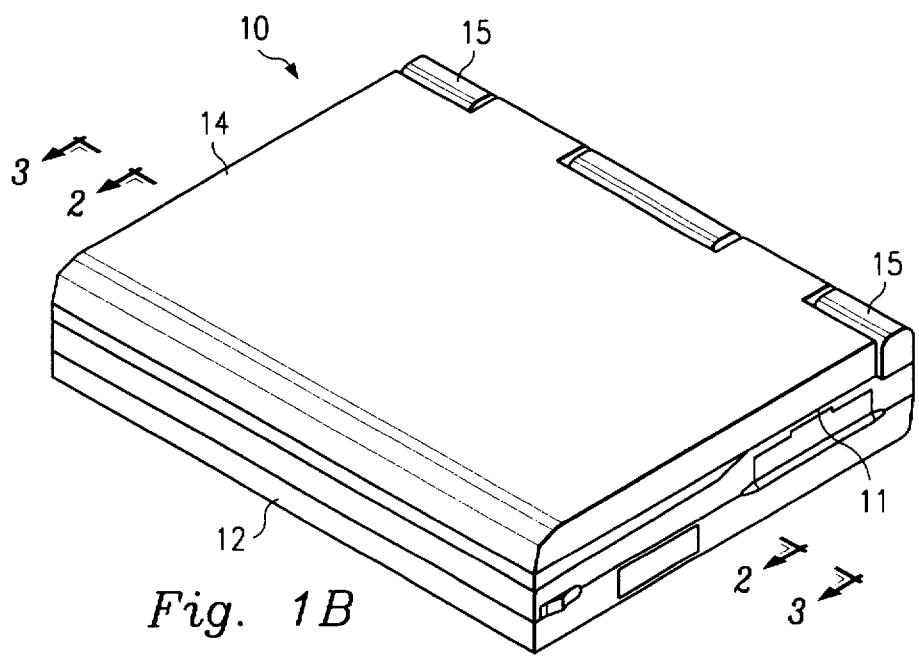
FIG. 1B is a perspective view of the portable PC of FIG. 1A showing the PC in a closed position.

As will be described in greater detail with reference to FIG. 2 below, in accordance with a feature of the present invention, when the lid 14 is closed, as illustrated in FIG. 1B, the left and right bezel members 20c, 20d, respectively depress the rightmost and leftmost key of each row of the keyboard 16. Similarly, the top bezel member 20a depresses one or more of the bottommost rows of keys of the keyboard 16.

Figure 2:
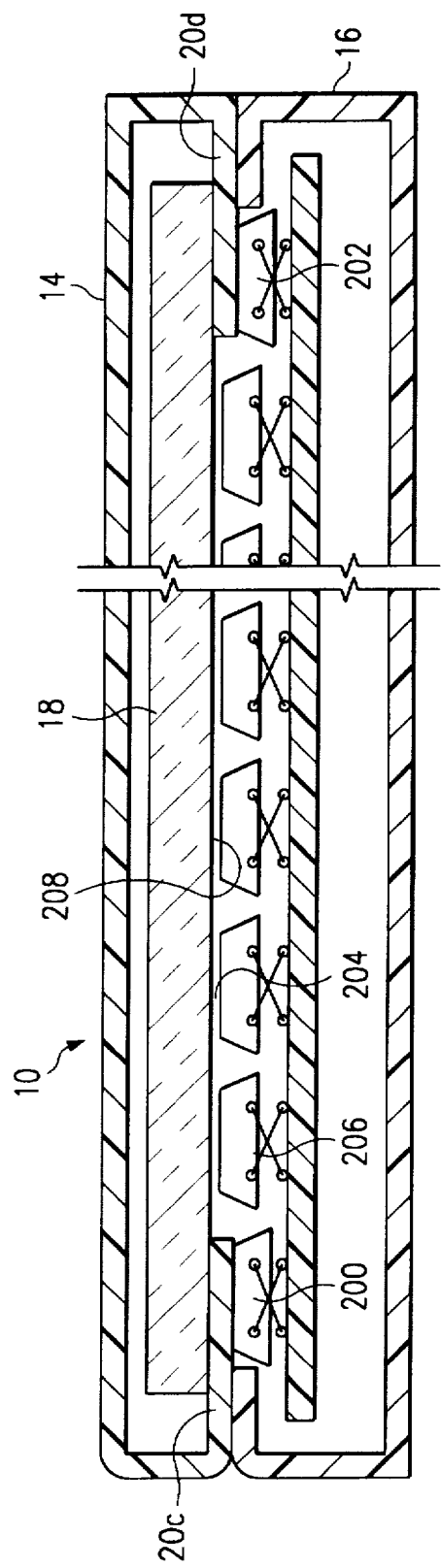
FIG. 2 is a partial cross-sectional view of the PC shown in FIG. 1B taken along the line II—II

FIG. 2 is a partial sectional view of the PC 10 taken along the line II in FIG. 1B. As shown in FIG. 2, when the lid 14 of the PC 10 is closed, the left bezel member 20c comes into contact with and partially depresses the leftmost key 200 in each row of keys of the keyboard 16, while the right bezel member 20d comes into contact with and partially depresses the rightmost key 202 in each row of keys of the keyboard 16. Similarly, although not shown, it should be recognized that when the lid 14 is closed, the top bezel member 20a comes into contact with and partially depresses the keys in at least the bottommost row of keys of the keyboard 16. A small gap 204 remains between the tops of the keys 206 underlying the LCD 18 and the surface 208 of the LCD 18 to prevent the keys 206 from scratching or otherwise damaging the surface 208 when the lid 14 is closed.

Although the keyswitch assemblies are shown in FIG. 2 as comprising "scissor-type" return mechanisms, it will be recognized that any one of a number of different types of return mechanisms known in the art may be used, so long as the selected mechanism is capable of withstanding storage in a depressed position for an extended period of time.

Figure 3:
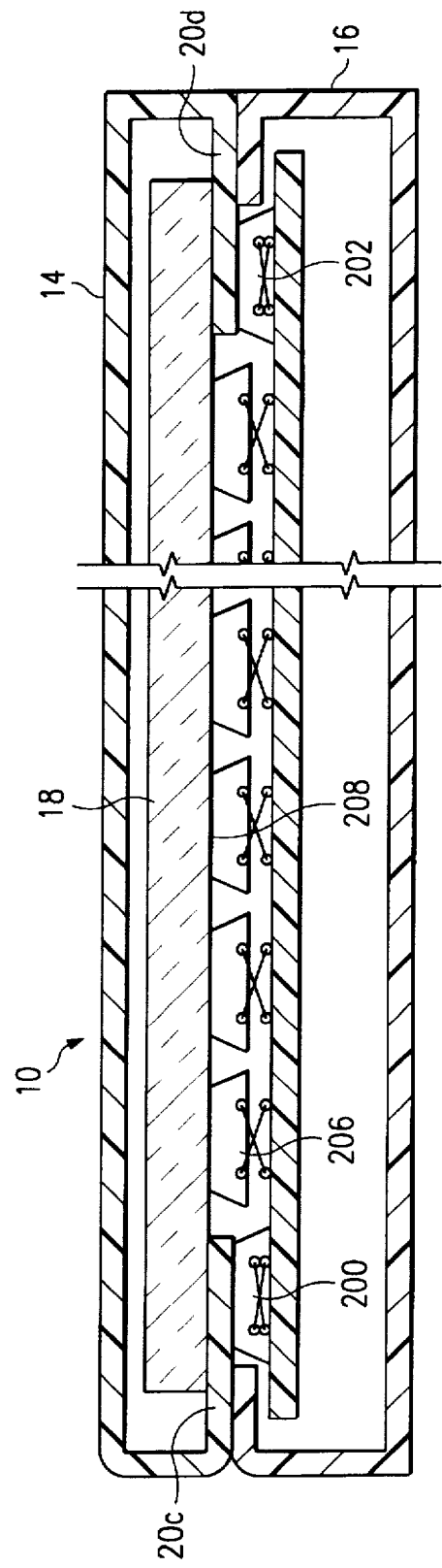
FIG. 3 is a partial cross-sectional view of an alternative embodiment of the PC shown in FIG. 1B taken along the line III—III.

FIG. 3 is a partial sectional view of an alternative embodiment of the PC 10 taken along the line III—III in FIG. 1B. In the embodiment shown in FIG. 3, the LCD 18 is fabricated from or coated with a scratch-resistant material such that the gap 204 between the keys 206 and the surface 208 of the LCD 18, as shown in FIG. 2, may be eliminated. In the embodiment illustrated in FIG. 3, the left and right bezel members 20c, 20d, respectively depress the leftmost and rightmost keys 200, 202, in each row to the maximum extent possible, while the LCD 18 partially depresses the keys 206 underlying the LCD 18 to an extent necessary to enable the lid 14 to be closed. It will be recognized that the amount by which the keys 206 are depressed will be dependent on the thickness of the left and right bezel members 20c, 20d.

It is understood that the present invention can take many forms and embodiments. The embodiments shown herein are intended to illustrate rather than to limit the invention, it being appreciated that variations may be made without departing from the spirit or the scope of the invention. For example, any number of different return mechanisms may be used in place of the scissor-type return mechanism shown in FIGS. 2 and 3. Moreover, the number and locations of keys depressed by the bezel 20 will depend on the width of the bezel members 20a, 20c, 20d, and the placement of the keys relative thereto. Additionally, the invention could be implemented in portable computers in which the display 18 and bezel 20 are disposed on the top (or rear) surface of the lid 14, whereby the keys would be depressed by a surface within the computer other than the bezel 20 and/or display 18 when the lid 14 is closed.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A portable computer comprising:

a base;

a keyboard disposed on said base, said keyboard comprising a plurality of individual keys;

a lid rotatably attached to said base and positioned in an open position in which said keyboard is exposed and positioned in a closed position in which said keyboard is concealed by said lid; and means for depressing at least one key of said keys when said lid is in said closed position thereby minimizing thickness of said computer.

2. The apparatus of claim 1 wherein said lid is hingedly attached to said base and rotatable between said open and closed positions.

3. A portable computer comprising:

a base;

a keyboard disposed on said base, said keyboard comprising a plurality of individual keys;

a lid rotatably attached to said base and positioned in an open position in which said keyboard is exposed and positioned in a closed position in which said keyboard is concealed by said lid; and a bezel retained in said lid comprising left, right, upper and lower bezel members, said lid being connected to said base such that when said lid is in said closed position, said bezel depresses at least one of said keys.

4. The apparatus of claim 3 wherein when said lid is in said closed position, each of said left and right bezel members depresses at least one of said keys.

5. The portable computer of claim 3 wherein when said lid is in said closed position said top bezel member depresses at least one of said keys.

6. The portable computer of claim 4 wherein said keys are arranged in rows and wherein said at least one of said keys depressed by said left bezel member comprises a leftmost key in each of at least one of said rows of keys.

7. The portable computer of claim 4 wherein said at least one of said keys depressed by said right bezel member comprises a rightmost key in each of at least one of said rows of keys.

8. The portable computer of claim 3 further comprising a display retained in said lid by said bezel.

9. The portable computer of claim 8 wherein said display is scratch-resistant and wherein said lid is connected to said base such that when said lid is in said closed position, said display depresses at least one of said keys.

10. The portable computer of claim 8 wherein said display is scratch-resistant and wherein said lid is connected to said base such that when said lid is in said closed position, said display depresses at least of said keys other than said at least one of said keys depressed by said bezel.

11. A portable computer comprising:

a base;

a keyboard disposed on a top side of said base, said keyboard comprising a plurality of keys arranged in rows;

a lid hingedly attached to said base and rotatable between an open position in which said keyboard is exposed and a closed position in which said keyboard is concealed by said lid; and a bezel retained in said lid and comprising left, right, upper and lower bezel members;

wherein said lid is connected to said base such that when said lid is in said closed position, said left bezel member depresses a leftmost key in each of at least one of said rows and said right bezel member depresses at least a rightmost key in each of at least one of said rows.

12. The portable computer of claim 11 wherein when said lid is in said closed position said top bezel member depresses a plurality of keys comprising at least a bottommost row of keys of said keyboard.

13. The portable computer of claim 11 further comprising a display retained in said lid by said bezel.

14. The portable computer of claim 13 wherein said display is scratch-resistant and wherein said lid is connected to said base such that when said lid is in said closed position, said display contacts and depresses at least one of said keys.

15. A method of minimizing the height of a portable computer, said portable computer having a lid, a display disposed in said lid and retained therein by a bezel, a base and a keyboard disposed on said base, said keyboard comprising a plurality of keys arranged in rows, said lid being attachable to said base such that said lid is moveable between open and closed positions, the method comprising at least a portion of said bezel depressing at least one of said keys of said keyboard when said lid is in said closed position.

16. The method of claim 15 wherein said display and said bezel are disposed on said inner surface of said lid.

17. A method of minimizing the height of a portable computer, said portable computer having a lid, a display disposed in said lid and retained therein by a bezel, a base and a keyboard disposed on said base, wherein said display and said bezel are disposed on an inner surface of said lid, said keyboard comprising a plurality of keys arranged in rows, said lid being attached to said base such that said lid is moveable between open and closed positions, the method comprising:

at least a portion of said inner surface of said lid depressing at least one of said keys of said keyboard when said lid is in closed position, and said bezel comprises left and right bezel members, said depressing further comprising:

said left bezel member depressing a left most key of each of at least one of said rows while said lid is in close position; and said right bezel member depressing a right most key of each one of at least one of said rows while said lid is in said closed position.

18. The method of claim 17 wherein said bezel further comprises a top bezel member, said depressing further comprising:

said top bezel member depressing each key in a bottommost row of said keyboard while said lid is in said closed position.

19. The method of claim 17 wherein said display is a liquid crystal display ("LCD").

20. The method of claim 17 further comprising said display depressing a plurality of keys of said keyboard while said lid is in said closed position.

21. A method of constructing a portable computer comprising a base, the method comprising disposing a keyboard on said base and a plurality of keys arranged in rows, a lid, and a display disposed within said lid and retained therein by a bezel surrounding the periphery thereof, and hingely attaching said lid to said base in such a manner that while said lid is in a closed position, said bezel depresses at least one key of said keyboard.

22. A method of constructing a portable computer comprising a base, a keyboard disposed on said base and comprising a plurality of keys arranged in rows, a lid, and a display disposed within said lid and retained therein by a bezel surrounding the periphery thereof, said bezel comprises left and right bezel members, said method comprising the steps of:

hingely attaching said lid to said base in such a manner that while said lid is in a closed position, said bezel depresses at least one key of said keyboard;

said left bezel member depressing a leftmost key of each of at least one of said rows while said lid is in said closed position; and said right bezel member depressing a rightmost key of each of at least one of said rows while said lid is in said closed position.

23. The method of claim 22 wherein said bezel further comprises a top bezel member and wherein said top bezel member depresses each key in a bottommost row of said keyboard while said lid is in said closed position.

24. The method of claim 22 further comprising coating a front surface of said display with a scratch-resistant material.

25. The method of claim 24 further comprising said display depressing a plurality of said keys while said lid is in said closed position.

* * * * *